United States Patent [19]

Hopp et al.

[11] 4,168,839

[45] Sep. 25, 1979

[54] MEANS AND METHOD FOR INSTALLING CAPTIVE TYPE SPARK PLUG GASKETS

[75] Inventors: Harold P. Hopp, 43 Jackson Ave., Haworth, N.J. 07024; Rudolf Bohm, Fort Lee, N.J.

[73] Assignee: Harold P. Hopp, Haworth, N.J.

[21] Appl. No.: 779,278

[22] Filed: Mar. 18, 1977

[51] Int. Cl.² ............................................. F16J 15/08
[52] U.S. Cl. ..................................... 277/166; 277/11; 277/236; 29/156.61; 72/476
[58] Field of Search ...................... 29/156.61; 72/476; 277/166, 9.5, 11, 236

[56] References Cited

U.S. PATENT DOCUMENTS

| 3,099,456 | 7/1963 | Hopp | 277/166 |
| 3,299,504 | 1/1967 | Hopp | 277/236 |
| 3,948,532 | 4/1976 | Hopp | 277/166 |

*Primary Examiner*—Robert I. Smith

*Attorney, Agent, or Firm*—Charles E. Temko

[57] ABSTRACT

An improved tool for installing captive type spark plug gaskets upon a spark plug body characterized in the provision of a staking member which contacts the inwardly directed locking flange of a gasket in such manner as to form undulations in the plane thereof to provide the equivalent of metal thickness which is appreciably thicker than the original thickness of metal stock from which the gasket is formed. During a staking operation, the inwardly directed flange is further inwardly folded to reduce the effective diameter of the free edge portion thereof, so as to be positioned to lie upon the unthreaded undercut area adjacent the lower transverse surface of the plug body. Because of the effective increased thickness of the free edge of the inwardly folded flange, cross threading with respect to the thread of the shank does not occur when the plug is unthreaded from an engaged cylinder head opening, and the gasket remains captive on removal.

1 Claim, 6 Drawing Figures

MEANS AND METHOD FOR INSTALLING CAPTIVE TYPE SPARK PLUG GASKETS

BACKGROUND OF THE INVENTION

This invention relates generally to the field of spark plug gaskets, and more particularly to an improved means and method for installing a captive type which remains in engaged condition upon the threaded shank of a spark plug during installation and removal. The art is presently at a very highly developed state, and the invention lies in specific constructional details which permits simplification of the fabrication of the gasket, and the impartation of a completed configuration of the locking flange portion thereof at the time of installation.

In my recently issued U.S. Pat. No. 4,003,120; dated Jan. 8, 1977, entitled Captive Type Spark Plug Gasket And Tool For Installing Same, there is disclosed a captive type gasket of the class described including a plurality of interconnected compressible flanges which accomplish a sealing function between the plug body and the cylinder head, and an inwardly extending generally angularly disposed flange which is staked into position to engage the undercut portion of the threaded shank of the plug body. The free edge of the last mentioned flange is folded upon the free edge thereof to provide an effective thickness approximating the medial thickness of the spiral groove on the threaded portion of the shank to resist the tendency of the gasket to cross-thread when the plug is removed from the cylinder head, and thereby remain attached to the plug. In one embodiment, the free edge is folded through 180°. In another embodiment, the free edge is folded through approximately 90° relative to the plane of the remaining portion of the inwardly turned flange to provide the equivalent result.

While these constructions are effective for the contemplated purpose, the fabrication of the gasket requires the formation of the fold upon the free edge of a locking flange in either case. The formation of the fold requires an additional one or more progressive die stations, and the necessity of maintaining very close tolerances in the dies located at these stations.

The patent also discloses means for the installation of the above described gaskets. However, although the means performs both the function of aligning the gasket on the plug body, and subsequently folding the locking flange to maintain it in place, the means does require the use of gaskets including the disclosed fold edges, in order to obtain the contemplated result.

SUMMARY OF THE INVENTION

Briefly stated, the invention contemplates the provision of captive type spark plug gaskets including an inwardly deformable locking flange thereon, and means for installing the same. As contrasted with my prior construction, however, the folded free edge portion of the locking flange is eliminated, and the operative surface of the staking tool is provided with a non-planar generally undulating surface which simultaneously flattens the locking flange to reduce the internal diameter thereof, and impart to the flange a configuration corresponding to that of the above mentioned nonplanar surface. This modification permits the use of gaskets in which the free edge of the locking flange thereof is not folded or otherwise bent, the incrementation to the effective thickness of the edge occurring at the time of installation of the gasket. Manufacture of the gasket is thus materially simplified, and the method of installation may be employed using a wide variety of known prior art captive gaskets.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
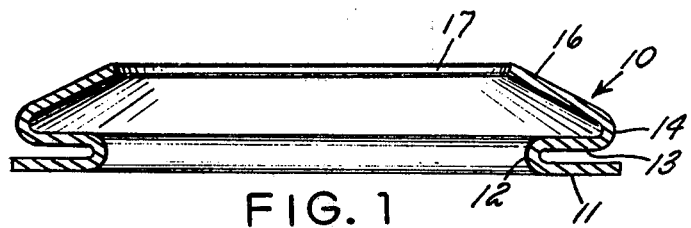
FIG. 1 is a longitudinal sectional view of a captive type spark plug gasket of known type, prior to installation.
Figure 2:
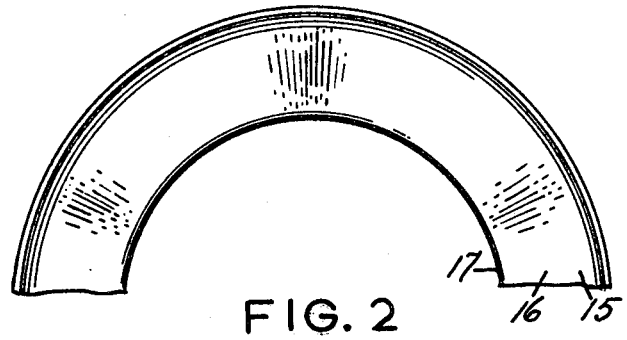
FIG. 2 is a fragmentary top plan view thereof.
Figure 3:
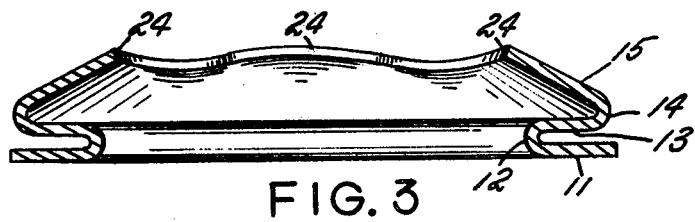
FIG. 3 is a longitudinal sectional view of the gasket of FIG. 1 showing deformation of the locking flange thereof imparted by an installation tool embodying the invention.
Figure 4:
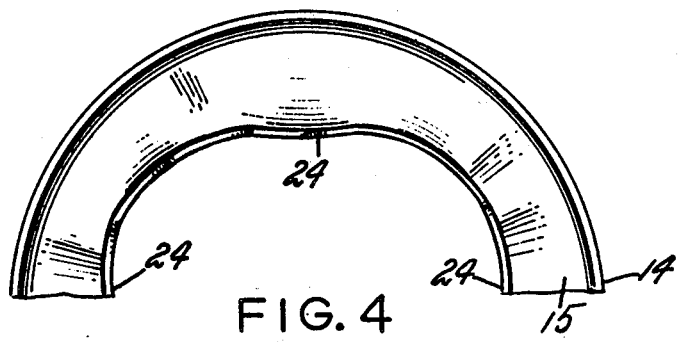
FIG. 4 is a fragmentary top plan view as seen from the upper portion of FIG. 3.

In accordance with the invention, the gasket, generally indicated by reference character 10, is illustrated in uncompressed condition in FIGS. 1 and 2. The gasket is formed as a multiple stage stamping operation from thin gauge sheet metal stock, to include a first sealing flange 11 interconnected by a bent portion 12 to a second sealing flange 13, in turn interconnected by a bent portion 14 to a third sealing flange 15. FIGS. 3 and 4 illustrate the device after partial compression obtained when the same is staked into captive relation with an associated spark plug.

Extending inwardly from the third flange 15 is an angularly disposed locking flange 16, having a free edge 17 which may be notched (not shown) to facilitate subsequent deformation.

Figure 5:
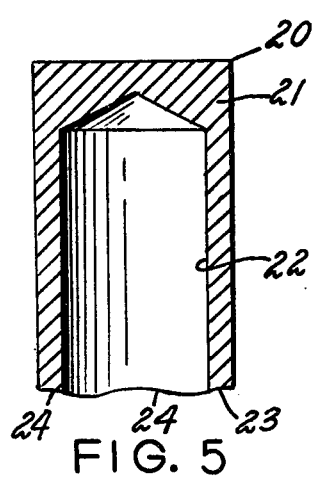
FIG. 5 is a longitudinal central sectional view of a staking tool embodying the invention.
Figure 6:
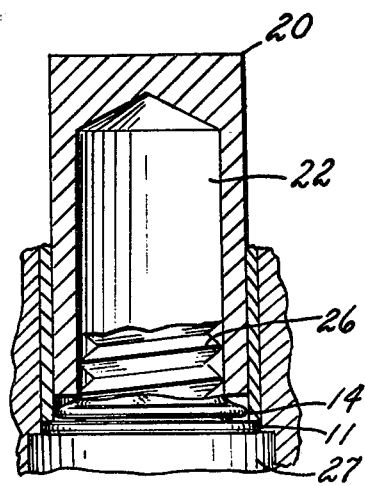
FIG. 6 is a longitudinal central sectional view, partly in elevation showing the tool of FIG. 5 in position for staking a gasket upon a spark plug body.

Referring to FIG. 5, there is illustrated an elementary staking tool 20 which may be used as shown in FIG. 6, or incorporated into the staking tool illustrated in my above mentioned U.S. Pat. No. 4,003,120. It is characterized in a cylindrical body 21 having a centrally disposed longitudinal bore 22 adapted to accommodate the threaded shank 26 of a spark plug 27. Bordering the bore 22 is an annular staking surface 23 having a plurality of undulations 24 thereon.

The installation of the gasket 10 upon the plug 27 resembles for the most part the manner disclosed in my prior U.S. Pat. No. 3,156,477. However, in addition to reducing the diameter of the free edge of the locking flange, as is known in the art, the undulations on the staking surface 23 as they contact the upper surface of the locking flange cause the undulating configuration to be imparted to the plane of the locking flange itself, this action occurring to the greatest degree upon the areas immediately adjacent the free edge of the locking flange. Thus, the effective thickness of the free edge is incremented to a degree depending upon the height of the undulations 24, and an effect equivalent to that disclosed in my U.S. Pat. No. 4,003,120 is obtained without the necessity of providing a fold area on the free edge of the locking flange. As disclosed in that patent, the result is a free edge having a thickness in a direction parallel to the principal axis of the spark plug body greater than the medial width of the continuous spiral groove formed by the thread on the threaded shank, and cross-threading is prevented.

We wish it to be understood that we do not consider the invention limited to the precise details of structure shown and set forth in this specification, for obvious modifications will occur to those skilled in the art to which the invention pertains.

We claim:

1. In a combination captive type spark plug gasket and staking tool therefore, for installing the same upon a threaded shank of a spark plug body, said gasket including a plurality of mutually compressible flanges and a deformable locking flange extending radially inwardly of said compressible flanges to be urged within an undercut area on said threaded shank under the compressive action of said tool, said locking flange having a free arcuate edge, said threaded shank defining a continuous spiral recess between adjacent convolutions of thread, the improvement comprising: said tool having an arcuate undulating staking surface disposed at an operative end edge of said tool, and extending generally transversely to the principal axis of said shank, said tool being adapted to surround said threaded shank of said plug body and flatten said locking flange to engaged condition within said undercut area while simultaneously imparting undulating configuration to said free edge to increase the effective thickness thereof to a degree substantially greater than the thickness of metal forming said locking flange, the areas bordering said free edge being thereafter prevented from cross-threading the thread on said shank.

* * * * *